United States Patent [19] [11] 4,121,222

Diebold et al. [45] Oct. 17, 1978

[54] DROP COUNTER INK REPLENISHING SYSTEM

[75] Inventors: Joseph M. Diebold, Schaumburg; George Arway, River Grove; Joseph James Stone, Northbrook, all of Ill.

[73] Assignee: A. B. Dick Company, Chicago, Ill.

[21] Appl. No.: 830,636

[22] Filed: Sep. 6, 1977

[51] Int. Cl.[2] .................... G01D 15/18

[52] U.S. Cl. .................... 346/75; 346/140 R

[58] Field of Search .................... 346/75, 140 R

[56] References Cited

U.S. PATENT DOCUMENTS

| | | | |
|---|---|---|---|
| 3,761,953 | 9/1973 | Helgeson | 346/75 |
| 3,930,258 | 12/1975 | Dick | 346/75 |
| 4,067,020 | 1/1978 | Arway | 346/75 |

*Primary Examiner*—Joseph W. Hartary

*Attorney, Agent, or Firm*—Peter S. Lucyshyn

[57] ABSTRACT

A system for printing with ink droplets each having a known quantity of ink which system has a hydraulic portion including a main ink supply, a supplemental ink supply and a recirculating droplet generating print head and an electronic portion which includes a character generator for electrically characterizing each of the droplets so that they are directed either to a print target or to a dump and a monitoring means for identifying the droplets assigned to strike the print target and controls in the hydraulic portion for permitting a metered additional quantity of ink, depending on the number of print target directed droplets counted, to flow from the supplemental ink supply to the main ink supply, thus, allowing use of a standard ink formulation in the supplemental ink supply.

11 Claims, 3 Drawing Figures

DROP COUNTER INK REPLENISHING SYSTEM

BACKGROUND OF THE INVENTION

This invention relates to a system for printing or writing with droplets of ink. The invention is particularly concerned with a drop writing system in which a writing head connected to an ink supply forms ink droplets and projects them toward a target, and selected ones of the droplets strike the print target while the unselected droplets return to the ink supply. During a drop writing operation of that type the ink is depleted in two ways. First, there is a portion of the ink which leaves the system because it strikes the print target. Secondly, there is a liquid portion of the ink which evaporates on exposure to air. The evaporation occurs at a higher rate with solvent based inks than with aqueous based inks, and the evaporation loss increases as more of the ink is recirculated. In prior art systems, the ink supply is replenished by adding a specially formulated so-called make-up ink. The formulation depends upon the nature of the printing. If in one installation a substantial amount of the ink is recirculated in relation to the amount of ink expended in printing and in another installation much less ink is recirculated for the same given amount of ink expended in printing, then the make-up ink for the first installation is provided with a greater amount of solvent.

It has been difficult to formulate the make-up inks appropriately to meet the different types of applications for droplet writing systems. Furthermore, it has been costly and a burden to inventory many formulations of make-up inks. Finally the prior art approach of replenishing the ink supply by using selectively formulated make-up inks has not been fully satisfactory because if the printing pattern varies so that the make-up ink is not appropriate because it includes more solvent and less solids than required, or vice versa, then the composition of the ink in the ink supply is modified and the effect is that optimum printing results are not obtained. An ink jet system using a make-up ink replenishing arrangement is shown in Dick et al. U.S. Pat. No. 3,930,258, assigned to A. B. Dick Company, assignee of the present application.

SUMMARY OF THE INVENTION

The present invention involves means for determining to a reasonable degree of preciseness the quantity of ink that leaves a drop writing system to strike a print target and replenishing the ink so expended with additional ink of the same formulation that was charged into the system at the beginning. Accordingly, by not requiring special formulations of make-up ink to maintain the main ink supply, the operation and maintenance of a drop writing system is simplified. The invention is particularly adaptable to a drop writing system in which ink droplets, each having a known quantity of ink, are projected toward a print target and a charge level controlling means is responsive to data signals regulate the charge level of the droplets so as to select which droplets are to strike the print target and which droplets are to be returned to an ink supply in the system.

The system practicing the invention includes a supplemental ink supply coupled to the main ink supply. One preferred means for selectively providing a predetermined rate of flow of ink of the same composition as that in the main ink supply is a valve means which is operated periodically for a preset period of time to replenish that portion of the main ink supply used to print.

The valve means is controlled by a timer responsive to a counter which is associated with the droplet charge level control means and monitors signals which represent droplets that are directed to the print target. The counter accumulates a count representing a predetermined number of droplets expended by the system to strike the print target. That predetermined number of droplets corresponds to a certain quantity of ink. The timer is programmed to hold the valve open for a preset period of time computed by dividing the flow rate of the valve into the quantity of ink represented by the predetermined number of droplets that were counted.

Accordingly, the ink used or expended in printing is replenished by ink of the same composition as was originally loaded into the drop writing system. The solvent loss due to evaporation is replaced by adding a quantity of solvent that in addition to the quantity of added ink causes a weight balance means in the system to come into balance. Accordingly, besides reducing the guessing as to the extent of ink usage, the present invention eliminates the need for a special make-up ink formulation. By following the teachings of the present invention the maintenance of ink in the system can be effected by having in reserve (i) a supply of ink having a standard formulation developed to match the specific printing needs and (ii) a supply of the solvent used in that ink formulation.

Description of the Preferred Embodiment

Figure 1:
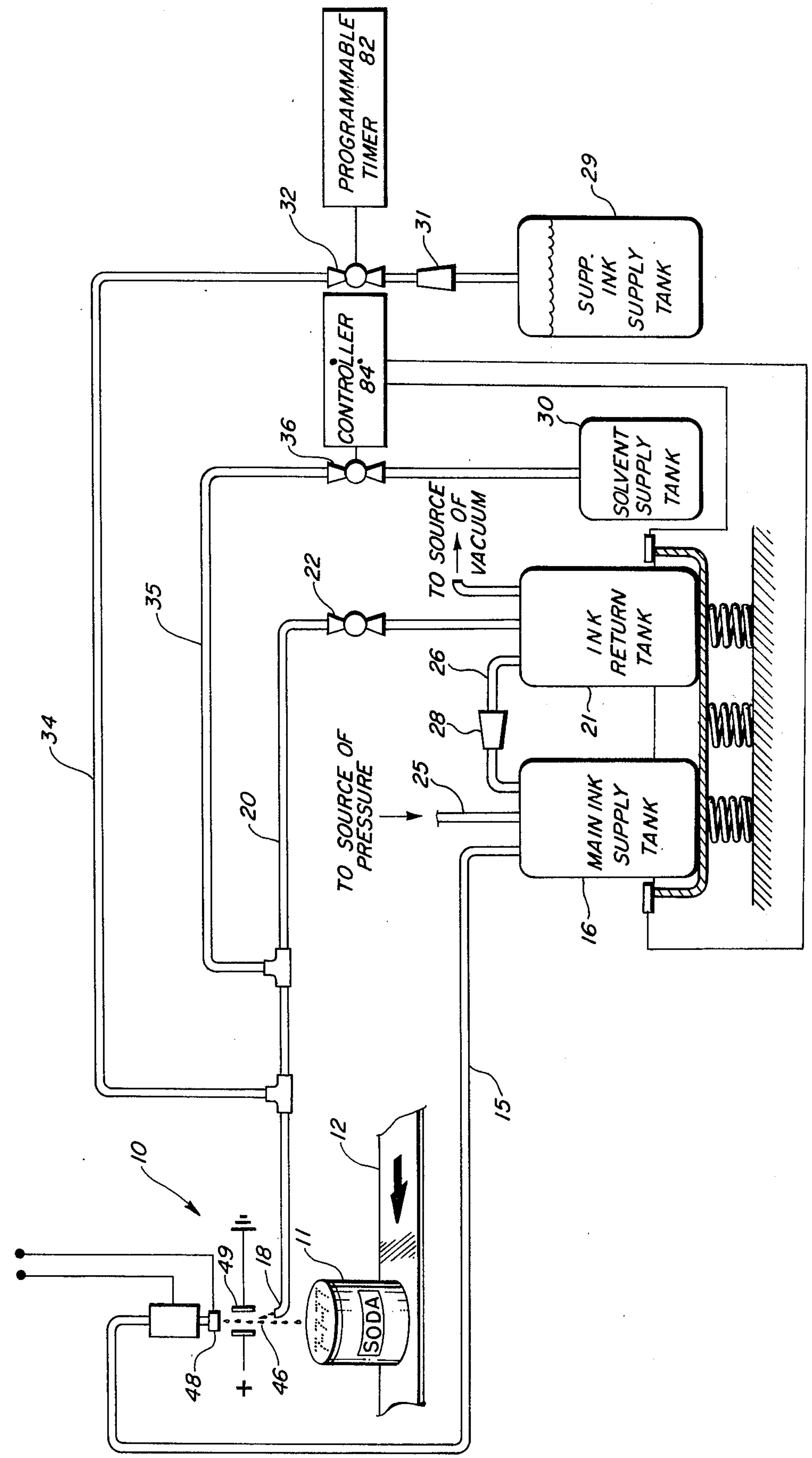
FIG. 1 is a diagrammatic representation of the ink handling portion of a drop writing system embodying the present invention.
Figure 2:
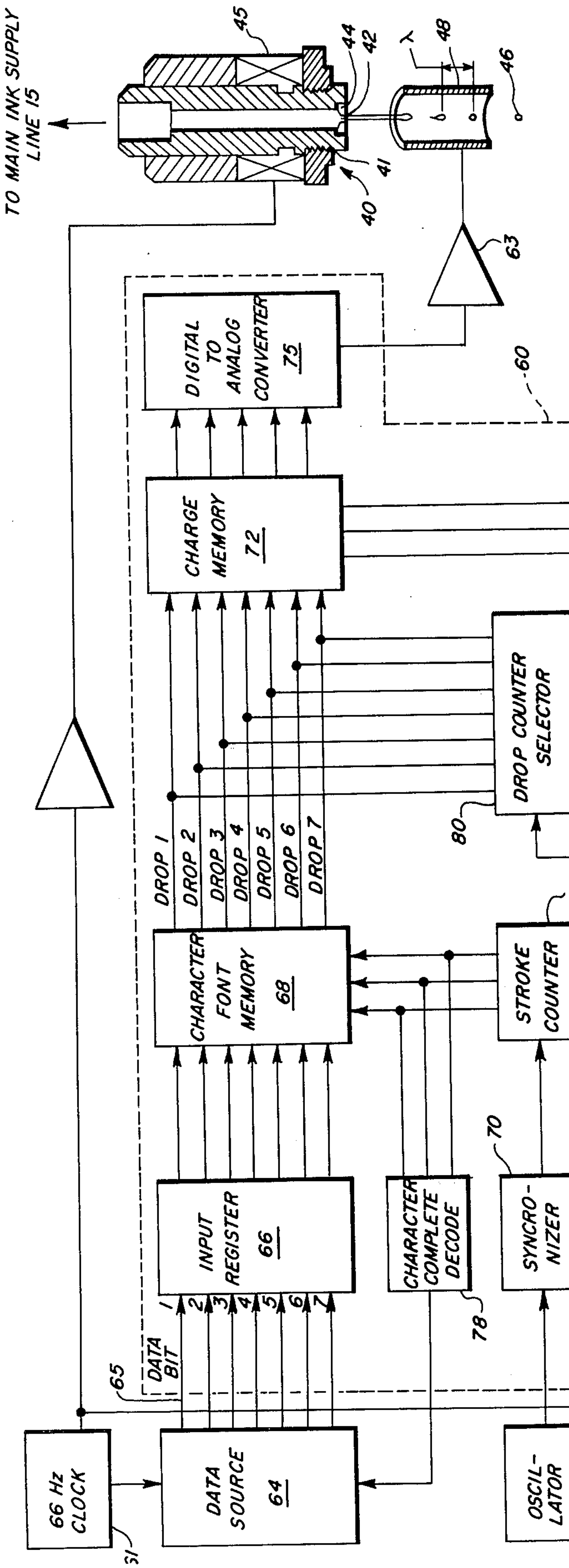
FIG. 2 is a schematic of the electrical control portion of a drop writing system embodying the present invention.

Turning to the drawings, FIG. 1 illustrates the ink handling or hydraulic portion of an exemplary system while FIG. 2 illustrates the electronic control portion of the same system for accomplishing the advantageous results of the present invention.

Turning to FIG. 1 thereshown is a print head assembly 10 for printing a date code on beverage cans 11 carried by a conveyor 12 driven at a velocity related to the ink drop rate issuing from the print head. The basic principal for an ink jet system of the type herein depicted is described in Sweet U.S. Pat. No. 3,596,275 issued July 27, 1971 and assigned to the assignee of the present application by mesne assignments. Ink preferrably having a solvent phase and a solids phase is supplied to the print head assembly 10 through a conduit 15 which is connected to a main ink supply tank 16. There is an ink return part to the hydraulic system which includes a gutter or sump 18 for catching the drops not used for printing and a conduit 20 for conveying that ink to a return tank 21. An ink return valve 22 is provided in the line 20 to selectively close-off the communication between the return tank and the gutter when the return tank is periodically placed under pressure to drive the ink from the tank 21 to the tank 16. The ink return tank is normally connected to a vacuum source (not shown) through a conduit 24. The main ink supply tank, on the other hand, is connected through a conduit 25 to a pressure source (not shown). The tanks 16 and 21 are connected by a line 26 which has a check valve 28 to permit the flow of ink from the ink return tank 21 to the main ink supply tank 16 but prevent the flow back of ink from the tank 16 to the tank 21. If the return tank 21 is placed under pressure as described, the ink is forced through the line 26 and the check valve 28 into the main ink supply tank. The replenishment of ink used in printing and of solvent lost to evaporation is achieved in the exemplary embodiment by providing a source of supplemental ink in a supply tank 29 and a source of solvent in supply tank 30. The supplemental ink supply tank 29 is connected to the ink return part of the system through a restrictor 31 and a valve 32 comprising a part of a line 34 connected to the main ink return line 20. Since the line 20 is connected to the ink return tank which is under vacuum during printing, the line 34 applies the vacuum to the supplemental ink supply tank and draws metered quantities of ink therefrom during the time the valve 32 is open as is described subsequently. The solvent supply tank is connected to the same main ink return line 20 by a conduit 35, which has a valve 36 that is selectively operable in response to controls described subsequently for replenishing solvent.

Describing the print head in more detail with reference to FIGS. 1 and 2, it includes an ink jet nozzle 40 having a body 41 connected at one end to a supply line 15 and having at the opposite end a precisely dimensioned aperture 42, which in the present instance is formed in a jewel 44. Mounted on the nozzle body is a piezoelectric member 45 which is electrically energized in a well known manner to cause periodic perturbations in the fluid stream issuing under pressure from the opening 42 to cause it to break-up into droplets 46. The droplets pass in proximity to a charging ring 48 which is selectively operable to induce a controlled charge on each of the individual droplets. After the charged droplets leave the charging ring they travel through a constant electrostatic field established by charge plates 49 and are deflected depending upon their charge level.

Turning now to FIG. 2 and specifically to the electronic controls for the ink jet printing system, thereshown is a character generator 60 which is in part similar to the type standard in certain A. B. Dick ink jet printers, for example the Model 9000 Series. Explaining the operation of the character generator, it is controlled by a master clock 61 which synchronizes the overall operation of the exemplary system at 66 kilohertz. A data source provides the data information identifying the specific alpha/numeric characters to be imprinted on the print surface. As described the ink jet nozzle 40 directs droplets 46 through a charging ring 48. A signal 62 (See FIG. 3) having predetermined voltage levels is applied to the charging ring by a charge amplifier 63 receiving an input from the character generator 60. The voltage level is selected during each drop period to have a value which will assign a predetermined charge level to each droplet thereby controlling the alighting position of each droplet, those droplets that have an electrical charge are deflected in accordance with their charge level by the fixed value electrostatic field generated by deflection plates 49. The droplet is directed either to strike a specific position on the printing surface or to enter the dump 18.

Figure 3:
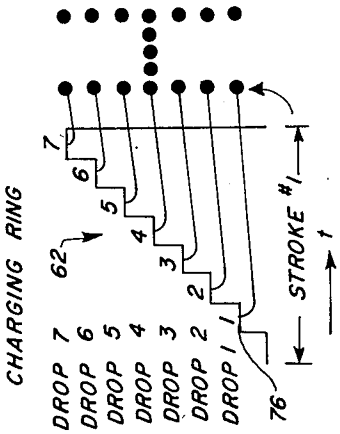
FIG. 3 is a diagrammatic showing of an exemplary ink droplet control and placement technique to generate a character.

To energize the character generator, a data source 64 is provided having an output 65, exemplarily shown as a 7-bit ASCII code. Each character to be printed, for example an "H" as shown in FIG. 3, is represented by the 7-bit code and that signal is received and stored in an input register 66. The latter supplies the 7-bit code signal over seven parallel lines to a character font memory 68. The specific information locations in the exemplary memory 68 are addressable by a 10-bit code, so an additional 3-bit code signal is required.

The characteristics of that additional signal can be understood by noting that the exemplary system, as depicted by the letter "H" in FIG. 3, uses a $5 \times 7$ matrix for printing characters. Each character is comprised of 5 columns or strokes and each such column or stroke is 7 droplets high. In the present instance the 3-bit code signal is utilized to identify which of the five strokes of a character are to be read out of memory. Thus, the combination of the 7-bit code with the 3-bit code will address information in memory on any stroke of any character.

Describing the generation of the 3-bit code for indicating the stroke, an oscillator 69 is provided which is coupled to the mechanism that drives the print surface, herein exemplarily shown as the conveyor 12. It is understood by those skilled in the art that many different print target drive mechanisms can be adapted for usage with the exemplary ink jet system described herein. The oscillator 69 is programmed to provide a pulse for each stroke of printing which is to be done on the print surface. The stroke pulses from the oscillator are delivered to a synchronizer 70 which also receives pulses from the master clock 61 at the 66 kilohertz frequency. The synchronizer modifies the timing of the stroke pulses from the external oscillator, if necessary, to bring them into synchronization with the 66 kilohertz master clock signal. The train of stroke pulses are fed into a stroke counter 71 which produces the aforementioned 3-bit stroke signal fed into the character font memory 68 to form the 10-bit signal necessary to address locations in memory representing each of the strokes of the characters to be printed by the system.

The character font memory 68 has a seven-line output which connects with a seven-terminal input of a charge memory 72. Each line carries information relating to a specific numbered droplet in each of the seven-high rows. That is, as exemplarily depicted, the top line in FIG. 1 always carries information for characterizing the bottom or No. 1 droplet of a stroke, the line immediately below always carries information on the next higher or No. 2 droplet of a stroke and so on. The system can be, of course, arranged to operate so droplet No. 1 is at the top of the stroke and the sequence reversed. The information which appears simultaneously on the seven-lines will portray one of the five strokes which make up a character matrix.

The charge memory 72 accepts the information coming in on all seven lines simultaneously. The electrical information is recognized as a specific pattern for a stroke. For example, if the character "H" is to be printed and the 3-bit code has called for the first stroke thereof to be printed, the charge memory will recognize that all seven droplets are to strike the printing surface. Programmed into the memory is a pattern of charge levels related to each other so as to compensate for aerodynamic and electrical interaction forces on the droplets to assure that the individual droplets strike the print surface accurately to form the selected stroke, in the present instance the left side of an "H". The charge memory 72 recognizes, for example, that the first stroke of an "E" is printed by the same pattern of charge levels as those for printing the first stroke of an "H".

Since charges are induced in the droplets serially, the charge level information in the charge memory 72 must be fed out sequentially. For example, the charge information for droplet No. 1 is supplied to the charging ring 16 first, the charge information for droplet No. 2 immediately thereafter, and so on until the charge levels for each of the seven droplets in a stroke have been delivered to the charging ring. To sequentially produce the droplet charge level information, a drop selector 74 provides a 3-bit signal to the charge memory. The drop selector counter produces a 3-bit signal every 1/66,000th of a second in the exemplary system which, of course, is in synchronism with the master clock frequency. The drop selector counter 74 will produce seven sets of 3-bit signals, each set representing one of the droplets Nos. 1 through 7, respectively, in a stroke. The charge memory 72 will produce a 5-bit code which is delivered to a digital-to-analog convertor 75. The latter produces a specific charge level, as exemplarily represented in FIG. 3 by a step 76, and that is the signal applied to the charging ring 48 through amplifier 63 to charge the droplets to cause each to be correctly directed and thereby strike areas on the print surface to form a stroke of the printed character. Of course, the charge level assigned to the droplets may cause it to alight in the dump 18.

The drop selector counter 74 after it has produced the seventh 3-bit signal, will produce a pulse. That pulse applied to the stroke counter 71 increments it one count and causes it to produce another 3-bit signal which, in the manner described above, cooperates with the 7-bit signal from the input register 66 to read out from the character font memory the information regarding the next stroke in the character matrix. The drop selector 74 will also reset itself at that time to start another sequence of seven 3-bit signal counts. The output of the stroke counter 71 is monitored by a character complete decoder 78 which will sense when a stroke counter has produced five sets of 3-bit signals to indicate that the character matrix has been covered and all the information for printing the character has been supplied to the charging ring. The character complete decoder will transmit a data request signal to the data source 64 to initiate the delivery of another 7-bit ASCII code signal identifying the next character to be printed. It will be understood by those skilled in the art that the character matrix may take many other forms, for example, a 9 × 7 matrix may be used which means 9 drops to a stroke and 7 strokes. Also, codes other than ASCII can be used. These and many other alternatives are known to the skilled artisan.

In accordance with the present invention an electronic monitoring means is coupled to the character generator in order to count the number of droplets which are characterized to cause them to be directed to strike the print surface. In the present instance that monitoring means takes the form of a drop counter selector 80 which senses the output from the character font memory 68 to indicate that a droplet charge level has been called out which will cause a droplet to strike the print target 11. The drop selector 74 provides a 3-bit signal each 1/66,000th of a second, which is the rate at which droplets are formed, and that signal is connected by a set of lines 74*a*, 74*b*, 74*c* to the drop counter selector 80 to coordinate its operation to sequentially read-out droplet charge level information which appears simultaneously on the seven lines. The output from the drop counter selector 80 is fed over a line 80*a* to a counter 81 which counts once for each droplet sensed that has a printing change level, and it thereby provides a representation of the number of droplets directed at the print target. Upon achieving a predetermined count, the counter 81 delivers a signal to a programmable timer 82. The latter preferrably is connected to the valve 32, for example via a solenoid (not shown) to open and close the valve and thereby permit a metered quantity of fresh ink to flow into the main ink supply 16 by way of the ink return tank 21. The timer 82 maintains the valve open for a preset period of time sufficient to replenish the amount of ink contained in the predetermined number of droplets which have been expended by deposition on the print surface.

The present invention is preferably used in an ink jet installation where the droplets each have about the same quantity of ink. In one preferred embodiment of the invention the following relationship exists between the ink droplet count and the length of time that the supplemental ink flows into the main ink supply:

$$\text{time} = (n \times X/Y)$$

time = minutes the valve 32 is held open by the programmable timer 82

$n$ = number of droplets counted $X$ = millileters of ink per droplet $Y$ = the flow rate in millileters per minute at which the supplemental ink system allows ink to enter the main ink supply.

The quantity of ink in each droplet, or the value for "X", was computed, in one instance where the present invention was practiced, to be $1.0 \times 10^{-6}$ml. Explaining, the spacing between the droplets λ was 0.03175 centimeters as set by the level of pressure applied by the pressure source driving ink out of the nozzle orifice 42 in a manner well-known by technicians working with ink jet. The diameter of the opening or orifice in the nozzle was 63 microns. As is known, generally cylindrical segments of ink break apart and form droplets. The cylinderical segments project from the nozzle through opening 42. Thus, the volume of that cylinder can be approximated to an acceptable degree of accuracy by using the well-known formula for the volume of a cylinder: TI × radius × length. The radius of the cylinder was 31.5 microns (one-half the orifice diameter), and the length of the cylinder was equal to λ, in this instance 0.03175 centimeters. Thus, the volume of the cylindrical segment of ink was computed to be just under $1.0 \times 10^{-6}$ml. One million such droplets constitute a quantity of one millileter of ink. In the aforementioned exemplary practice of the invention, the counter 81 was set to respond to a count of 5 million droplets (the "$n$" in the above formula) which constituted 5 millileters of ink and upon counting that number of droplets a signal was delivered by the counter to the programmable timer 82. The restrictor 31 in that instance had a flow rate of 5 ml./minute at a vacuum of 10 in. Hg. (the "Y" in the above formula). Thus, the programmable timer 82 was set to respond to the signal from counter 81 by maintaining the valve 32 open for 1 minute thereby causing 5 millileters of ink to flow from the supplemental ink supply to the main ink supply.

The quantity of supplemental ink metered into the main supply may be done by other means than flow rate control means, as will be appreciated by those skilled in the art. For example, the supplemental ink supply may have a "one-shot" receptacle which holds a quantity of ink equal to that contained in "*n*" droplets and on command from the counter 81 dumps ink into the main supply.

In order to maintain the solvent level where it should be in the main ink system, the present invention contemplates in one instance the use of a weighing means or scale system such as is depicted in the aforementioned Dick et al. U.S. Pat. No. 3,930,258. The scale provides controls for periodically replenishing the material that leaves the main ink supply by adding material until the system comes into balance. In the present instance the ink added from the supplemental ink supply will not be sufficient to bring the system into balance so periodically a controller 84 is instructed to maintain the valve 36 open for a period of time until the ink weighing scales are brought into balance. That replenishes the solvent lost to evaporation.

In order to allow the system to monitor more than one print head, a multiplexer 85 is exemplarily shown. In the present instance the multiplexer 85 includes a shift register 86 which receives the 66 kilohertz master clock signal and a 2.112 megahertz multiplexing signal.

The latter signal is sychronized with the clock and creates six pulses during each clock signal, which pulses are individually directed to read out the drop counter data selectors of the respective six heads of an exemplary six head printer. Thus, at some point during each 1/66,000th of a second a pulse will read out the state of each of the six drop counter data selectors. By timing the scanning operation in that manner, it can be determined during each droplet period the presence of all droplet charge level control signals in the system destined to characterize droplets so that they strike the print target. This is so because the droplets are produced at a rate of one every 1/66,000th of a second and each droplet stream is checked every 1/66,000th of a second.

As is clear from the foregoing description of an exemplary embodiment the present invention utilizes signals that characterize the ink droplets in an ink jet printing system to identify those droplets which are assigned to strike the printing surface. Thus, though an electrical charging characterization is herein shown, other means such as magnetic characterization could also be used and the teaching of the present invention could be advantageously applied to count the print droplets and replenish the ink so expended. Also, though the exemplary embodiment shows printing of alpha/numeric characters, the invention can be used where printing of other forms is used and similarly selected droplets are expended by deposition on a print target while other droplets ae circulated and returned to the ink supply or reservoir.

While we have described our invention in connection with one specific embodiment, it is understood that this is by way of illustration and not by way of limitation and the scope of our invention is to be defined by the appended claims which should be construed as broadly as the prior art will permit.

What we claim as our invention:

1. In a drop writing system for projecting ink droplets toward a print target which has a main ink supply as the source for ink and in which certain of the droplets are selected to strike the print target while the remaining ink droplets are returned to the ink reservoir, the combination comprising:

(a) a print head connected to receive ink from the main ink supply and having an orifice of predetermined cross-sectional area for forming and projecting toward the print target ink droplets having a known quantity of ink;

(b) means for characterizing said droplets to select certain droplets to strike the print target;

(c) counting means responsive to said characterizing means for producing a count signal indicating that a number of droplets constituting a predetermined quantity of ink were selected to strike the print target;

(d) a supply of supplemental ink;

(e) flow control means responsive to said count signal for directing from said supplemental ink supply to the main ink supply a quantity of ink substantially equal to said predetermined quantity of ink.

2. The drop writing system of claim 1 wherein said means for characterizing said droplets effects control of the charge level of the droplets and includes a source of data signals, a character generator responsive to said data signals for producing a plurality of droplet charge level signals, certain of said signals representative of droplets selected to strike the print target.

3. The drop writing system of claim 2 wherein said counting means is responsive to said character generator charge level signals to produce said signal indicating selection of a predetermined number of droplets to strike the print target.

4. The drop writing system of claim 1 wherein said flow control means includes means for injecting a measured quantity of ink from said supplemental ink supply to the main ink supply.

5. In a drop writing system for projecting ink droplets toward a print target which has a main ink supply as the source for ink and in which certain of the droplets are selected to strike the print target while the remaining ink droplets are returned to the ink reservoir, the combination comprising:

(a) a print head connected to receive ink from the main ink supply and having an orifice of predetermined cross-sectional area for forming and projecting toward the print target ink droplets, each of said droplets having substantially X millileters of ink;

(b) a supply of supplemental ink;

(c) valve means for coupling said supplemental ink supply and the main ink supply which is operable to permit ink to flow to the ink reservoir at a rate of Y millileters per second;

(d) means for characterizing said droplets to select certain droplets to strike the print target;

(e) counting means responsive to said characterizing means for producing a count signal indicating that a predetermined number of droplets were selected to strike the print target; and (f) means responsive to said count signal for operating said valve means to permit ink to flow into the main ink supply for a predetermined period of time to replenish the ink expended in printing, said predetermined period of time being the quotient of the product of said predetermined number of expended droplets and said X millileters of ink dividied by said Y millileters per second.

6. The drop writing system of claim 5 wherein said means for characterizing said droplets effects control of the charge level of the droplets and includes a source of data signals, a character generator responsive to said data signals for producing a plurality of droplet charge level signals, certain of said signals representative of droplets selected to strike the print target.

7. The drop writing system of claim 6 wherein said counting means is responsive to said character generator charge level signals to produce said signal indicating selection of a predetermined number of droplets to strike the print target.

8. The combination of claim 7 wherein said valve operating means includes a timer responsive to said counting means signal to open said valve for a preset period of time.

9. The combination of claim 8 including a restrictor in fluid communication with said valve for establishing said predetermined flow rate of Y millileters per second.

10. In a method for maintaining the ink supply in an ink droplet writing system having a main ink supply, a supplemental ink supply and an ink solvent supply in which a stream of ink droplets having a known quantity of ink are projected toward a print target, certain of which droplets are selected to strike the print target and the remaining droplets are returned to the supply, the ink having a solvent phase and a solids phase, the steps comprising:

(a) counting only the droplets that are directed to strike the print target, (b) sensing when a predetermined number of said print target striking droplets have been counted to indicate a predetermined quantity of ink expended by the system, and (c) conveying to the main ink supply a quantity of ink equal to said predetermined quantity of ink from the supplemental ink supply to the main ink supply, the composition of the inks in said supplemental ink supply and in said main ink supply being substantially the same.

11. The method of claim 10 including in addition the steps of sensing the total quantity of ink depleted coincident with (d) counting said predetermined number of droplets, and (e) adding to the main ink supply a quantity of solvent equal to the difference between said total quantity of ink depleted and said predetermined quantity of ink expended by the droplets directed to the print target.

* * * * *

UNITED STATES PATENT AND TRADEMARK OFFICE

CERTIFICATE OF CORRECTION

PATENT NO. : 4,121,222

DATED : Oct. 17, 1978

INVENTOR(S) : Joseph M. Diebold et al.

It is certified that error appears in the above-identified patent and that said Letters Patent are hereby corrected as shown below:

Column 6, line 4, "change" should read -- charge --.

Column 7, line 54, "ae" should read -- are --.

Signed and Sealed this

*Sixteenth* Day of *October 1979*

[SEAL]

*Attest:*

RUTH C. MASON
*Attesting Officer*

LUTRELLE F. PARKER
*Acting Commissioner of Patents and Trademarks*